(12) United States Patent
Fujiwara

(10) Patent No.: US 8,349,749 B2
(45) Date of Patent: *Jan. 8, 2013

(54) OPTICAL GLASS, PREFORM FOR PRECISION PRESS MOLDING, OPTICAL ELEMENT AND METHOD OF MANUFACTURING THEREOF

(75) Inventor: Yasuhiro Fujiwara, Tokyo (JP)

(73) Assignee: Hoya Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/230,914

(22) Filed: Sep. 13, 2011

(65) Prior Publication Data

US 2012/0035044 A1 Feb. 9, 2012

Related U.S. Application Data

(63) Continuation of application No. 11/727,736, filed on Mar. 28, 2007, now Pat. No. 8,039,408.

(30) Foreign Application Priority Data

Mar. 28, 2006 (JP) ................. 2006-089116

(51) Int. Cl.
*C03C 3/15* (2006.01)
*C03C 3/068* (2006.01)
*C03B 11/00* (2006.01)

(52) U.S. Cl. ............... 501/50; 501/51; 501/78; 501/79; 65/64; 65/102; 65/126; 65/127

(58) Field of Classification Search .................. 501/50, 501/51, 78, 79; 65/64, 102, 126, 127
See application file for complete search history.

(56) References Cited

U.S. PATENT DOCUMENTS

| | | | |
|---|---|---|---|
| 4,111,707 A | 9/1978 | Komorita et al. | |
| 6,713,419 B1 | 3/2004 | Onozawa et al. | |
| 6,753,281 B2 | 6/2004 | Uehara | |
| 6,844,279 B2 | 1/2005 | Hayashi et al. | |
| 6,977,232 B2 | 12/2005 | Hayashi et al. | |
| 7,138,348 B2 | 11/2006 | Uehara | |
| 7,468,338 B2 | 12/2008 | Hayashi et al. | |
| 7,563,736 B2 | 7/2009 | Kobayashi et al. | |
| 7,598,189 B2 | 10/2009 | Fujiwara et al. | |
| 7,622,409 B2 | 11/2009 | Hayashi | |
| 8,012,896 B2 * | 9/2011 | Fujiwara | 501/78 |
| 8,039,408 B2 * | 10/2011 | Fujiwara | 501/50 |
| 2003/0050177 A1 | 3/2003 | Uehara | |
| 2003/0211929 A1 | 11/2003 | Hayashi et al. | |
| 2004/0116272 A1 | 6/2004 | Uehara | |
| 2005/0107240 A1 | 5/2005 | Uehara | |
| 2005/0113240 A1 | 5/2005 | Hayashi et al. | |
| 2005/0197243 A1 | 9/2005 | Hayashi | |
| 2006/0079390 A1 | 4/2006 | Kasuga et al. | |
| 2006/0194686 A1 | 8/2006 | Kobayashi et al. | |
| 2007/0179038 A1 | 8/2007 | Uehara | |
| 2008/0119348 A1 | 5/2008 | Hayashi et al. | |
| 2009/0099002 A1 | 4/2009 | Fujiwara | |

FOREIGN PATENT DOCUMENTS

| | | | |
|---|---|---|---|
| CN | 1374265 A | | 10/2002 |
| CN | 1666967 A | | 9/2005 |
| GB | 2137981 A | | 10/1984 |
| JP | 52-155615 | | 6/1976 |
| JP | 56169150 A | | 12/1981 |
| JP | 59169952 A | | 9/1984 |
| JP | 2000119036 A | | 4/2000 |
| JP | 2002249337 A | | 9/2002 |
| JP | 2003020249 A | | 1/2003 |
| JP | 2005026622 A | | 1/2005 |
| JP | 2005170782 A | | 6/2005 |
| JP | 2005247613 A | | 9/2005 |
| JP | 2005272194 A | | 10/2005 |
| JP | 2006016286 A | | 1/2006 |
| JP | 2006052119 A | | 2/2006 |
| JP | 2006117503 A | * | 5/2006 |

OTHER PUBLICATIONS

Japanese Office Action in corresponding Japanese Patent Application No. 2006-089116, dated Jan. 19, 2010.
Chinese Office Action corresponding to Chinese Patent Application No. 200710088829.1, Oct. 8, 2010.
Taiwanese Office Action corresponding to Taiwanese Patent Application No. 096110701, dated May 6, 2011.
Chinese Office Action corresponding to Chinese Patent Application No. 200710088829.1, dated Sep. 12, 2012.
Korean Office Action corresponding to Korean Patent Application No. 10-2007-0029575, dated Nov. 5, 2012.

* cited by examiner

*Primary Examiner* — Karl Group
*Assistant Examiner* — Elizabeth A Bolden
(74) *Attorney, Agent, or Firm* — Sughrue Mion, PLLC

(57) ABSTRACT

An optical glass having a refractive index $n_d$ of 1.70 or greater and an Abbé number of 50 or greater. Given as mole percentages, it comprises: $B_2O_3$ (20 to 80 percent), $SiO_2$ (0 to 30 percent), $Li_2O$ (1 to 25 percent), ZnO (0 to 20 percent), $La_2O_3$ (4 to 30 percent), $Gd_2O_3$ (1 to 25 percent), $Y_2O_3$ (0 to 20 percent), $ZrO_2$ (0 to 5 percent), MgO (0 to 25 percent), CaO (0 to 15 percent), and SrO (0 to 10 percent), with the combined quantity of the above components being 97 percent or greater. The molar ratio of $\{ZnO/(La_2O_3+Gd_2O_3+Y_2O_3)\}$ is 0.8 or less and the molar ratio of $\{(CaO+SrO+BaO)/(La_2O_3+Gd_2O_3+Y_2O_3)\}$ is 0.8 or less. $Ta_2O_5$ may be incorporated as an optional component, with the molar ratio $\{(ZrO_2+Ta_2O_5)/(La_2O_3+Gd_2O_3+Y_2O_3)\}$ being 0.4 or less.

26 Claims, 1 Drawing Sheet

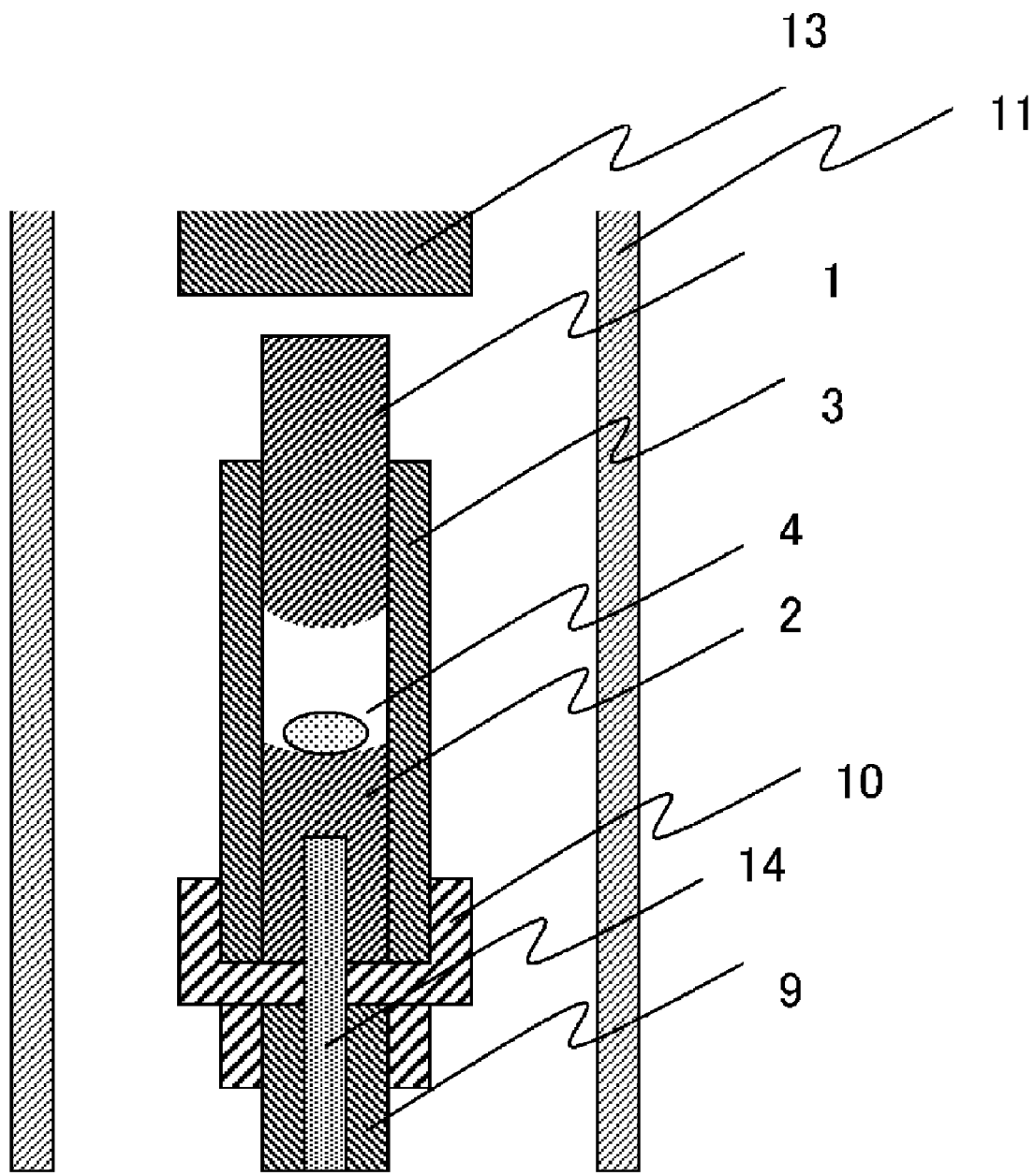

OPTICAL GLASS, PREFORM FOR PRECISION PRESS MOLDING, OPTICAL ELEMENT AND METHOD OF MANUFACTURING THEREOF

CROSS-REFERENCE TO RELATED APPLICATIONS

This is a Continuation of application Ser. No. 11/727,736 filed Mar. 28, 2007, now U.S. Pat. No. 8,039,408, issued on Oct. 18, 2011, claiming priority based on Japanese Patent Application No. 2006-089116, filed on Mar. 28, 2006, the contents of all of which are incorporated herein by reference in their entirety.

BACKGROUND OF THE INVENTION

1. Field of the Invention

The present invention relates to an optical glass having the optical constants of a refractive index nd of 1.70 or greater and an Abbé number $v_d$ of 50 or greater, a preform for precision press molding comprised of this glass, an optical element comprised of this glass, and methods of manufacturing the same.

2. Discussion of the Background

With the advent of digital cameras and cellular telephones equipped with cameras, the degree of integration and the high degree of functionality of devices employing optical systems have advanced rapidly. At the same time, the demand for high precision, lightweight, compact optical systems is increasing.

In recent years, to meet the above need, optical designs employing aspherical lenses have been increasingly coming into the mainstream. Thus, to stably supply large numbers of aspherical lenses employing highly functional glass at low cost, precision press molding (also known as a mold pressing technique), in which an optical functional surface is directly formed by press molding without grinding or polishing steps, has attracted attention. The demand for optical glass having low temperature softening properties suited to precision press molding is increasing each year. Among such optical glasses, there are high refractive index, low dispersion glasses. An example of such a glass is described in Japanese Unexamined Patent Publication (KOKAI) No. 2002-249337 or English language family member U.S. Patent Application No. 2003-125186 AA, which are expressly incorporated herein by reference in their entirety.

To take full advantage of the above precision press molding technique, a glass material known as a preform is desirably directly formed from glass melt. This method is known as the preform hot molding method. A glass melt is caused to flow out, glass melt gobs of a weight corresponding to single preforms are separated one after another, and the glass melt gobs obtained are cooled to form preforms having smooth surfaces. Accordingly, in contrast to the method of forming large glass blocks from glass melt and cutting, grinding, and polishing the glass blocks, this method affords excellent characteristics in the form of a higher glass use rate, the fact that no glass shavings are produced during processing, and zero processing time and cost.

However, in the hot molding method, a glass melt gob of a weight corresponding to a single preform is accurately separated and a preform molded in such a manner that devitrification and defects such as striae do not result. Accordingly, a glass having good glass stability in the high temperature range of hot molding is required.

When the refractive index $n_d$ is raised while maintaining an Abbé number $v_d$ of a prescribed level or above, the tendency of the glass to crystallize intensifies, thereby compromising vitrification. Since a low temperature softening property is further imparted to the glass employed in precision press molding, there tends to be a drop in glass stability. Accordingly, it is difficult to realize glass stability at a level permitting the hot molding of preforms while maintaining an Abbé number $v_d$ of 50 or greater, preferably 52 or greater, a refractive index $n_d$ of 1.70 or greater, and a low temperature softening property suited to precision press molding.

The present invention provides an optical glass exhibiting good glass stability while having a refractive index nd of 1.70 or greater, an Abbé number vd of 50 or greater, and a low temperature softening property. The present invention further relates to a preform for precision press molding comprised of the above glass, an optical element comprised of the above glass. The present invention further provides a method for manufacturing the preform for precision press molding comprised of the above glass and a method for manufacturing the optical element comprised of the above glass.

SUMMARY OF THE INVENTION

The present invention relates to an optical glass having a refractive index $n_d$ of 1.70 or greater and an Abbé number of 50 or greater, and, given as mole percentages, comprising:

| | |
|---|---|
| $B_2O_3$ | 20 to 80 percent, |
| $SiO_2$ | 0 to 30 percent, |
| $Li_2O$ | 1 to 25 percent; |
| ZnO | 0 to 20 percent, |
| $La_2O_3$ | 4 to 30 percent, |
| $Gd_2O_3$ | 1 to 25 percent, |
| $Y_2O_3$ | 0 to 20 percent, |
| $ZrO_2$ | 0 to 5 percent, |
| MgO | 0 to 25 percent, |
| CaO | 0 to 15 percent, |
| SrO | 0 to 10 percent, | with the combined quantity of the above components being 97 percent or greater; the molar ratio of $\{ZnO/(La_2O_3+Gd_2O_3+Y_2O_3)\}$ being 0.8 or less and the molar ratio of $\{(CaO+SrO+BaO)/(La_2O_3+Gd_2O_3+Y_2O_3)\}$ being 0.8 or less; $Ta_2O_5$ may be incorporated as an optional component, with the molar ratio $\{(ZrO_2+Ta_2O_5)/(La_2O_3+Gd_2O_3+Y_2O_3)\}$ being 0.4 or less.

The present invention provides an optical glass exhibiting good glass stability while having a refractive index nd of 1.70 or greater, an Abbé number $v_d$ of 50 or greater, and a low temperature softening property. The present invention further relates to a preform for precision press molding comprised of the above glass, an optical element comprised of the above glass. The present invention further provides a method for manufacturing the preform for precision press molding comprised of the above glass and a method for manufacturing the optical element comprised of the above glass.

Other exemplary embodiments and advantages of the present invention may be ascertained by reviewing the present disclosure and the accompanying drawings.

BRIEF DESCRIPTION OF THE DRAWINGS

The present invention will be described in the following text by the exemplary, non-limiting embodiments shown in the figures, wherein:

FIG. 1 is a descriptive sectional drawing of a precision pressing mold.

| | |
|---|---|
| 1: | Upper mold |
| 2: | Lower mold |
| 3: | Sleeve mold |
| 4: | Preform for precision press molding |
| 9: | Support rod |
| 10: | Support member |
| 11: | Quartz tube |
| 13: | Pressing rod |
| 14: | Thermocouple |

DESCRIPTIONS OF THE EMBODIMENTS

The following preferred specific embodiments are, therefore, to be construed as merely illustrative, and not limitative of the remainder of the disclosure in any way whatsoever. In this regard, no attempt is made to show structural details of the present invention in more detail than is necessary for the fundamental understanding of the present invention, the description taken with the drawings making apparent to those skilled in the art how the several forms of the present invention may be embodied in practice.

The present invention is described in detail below.

[Optical Glass]

The optical glass of the present invention has a refractive index $n_d$ of 1.70 or greater and an Abbé number of 50 or greater. Given as mole percentages, it comprises:

| | |
|---|---|
| $B_2O_3$ | 20 to 80 percent, |
| $SiO_2$ | 0 to 30 percent, |
| $Li_2O$ | 1 to 25 percent; |
| ZnO | 0 to 20 percent, |
| $La_2O_3$ | 4 to 30 percent, |
| $Gd_2O_3$ | 1 to 25 percent, |
| $Y_2O_3$ | 0 to 20 percent, |
| $ZrO_2$ | 0 to 5 percent, |
| MgO | 0 to 25 percent, |
| CaO | 0 to 15 percent, |
| SrO | 0 to 10 percent, | with the combined quantity of the above components being 97 percent or greater. The molar ratio of $\{ZnO/(La_2O_3+Gd_2O_3+Y_2O_3)\}$ is 0.8 or less and the molar ratio of $\{(CaO+SrO+BaO)/(La_2O_3+Gd_2O_3+Y_2O_3)\}$ is 0.8 or less. $Ta_2O_5$ may be incorporated as an optional component, with the molar ratio $\{(ZrO_2+Ta_2O_5)/(La_2O_3+Gd_2O_3+Y_2O_3)\}$ being 0.4 or less.

Unless specifically stated otherwise, the various contents and combined quantities given below are mole percentages, and the content ratios, combined content ratios, and content-to-combined content ratios are molar ratios.

In the present invention, the molar ratio of $\{(CaO+SrO+BaO)/(La_2O_3+Gd_2O_3+Y_2O_3)\}$ refers to the ratio of the combined content of CaO, SrO, and BaO to the combined content of $La_2O_3$, $Gd_2O_3$ and $Y_2O_3$. The molar ratio of $\{ZnO/(La_2O_3+Gd_2O_3+Y_2O_3)\}$ refers to the ratio of ZnO to the combined content of $La_2O_3$, $Gd_2O_3$, and $Y_2O_3$. And the molar ratio of $\{(ZrO_2+Ta_2O_5)/(La_2O_3+Gd_2O_3+Y_2O_3)\}$ refers to the ratio of the combined content of $ZrO_2$ and $Ta_2O_5$ to the combined content of $La_2O_3$, $Gd_2O_3$, and $Y_2O_3$.

$B_2O_3$, a glass network-forming component, is an essential component functioning to impart a low dispersion property and lower the glass transition temperature. At a content of less than 20 percent, the stability of the glass decreases, the liquidus temperature rises, and it becomes difficult to mold preforms. Conversely, the refractive index decreases when an excessively large quantity is incorporated. Accordingly, the content of $B_2O_3$ in the present invention is set to 20 to 80 percent, with a range of 25 to 75 percent being desirable and a range of 25 to 72 percent being preferable.

$SiO_2$ is an optional component the incorporation of which in suitable quantity enhances the stability of the glass and functions to impart a viscosity suitable for molding when molding preforms out of glass melt. However, the refractive index drops and the meltability of the glass decreases when incorporated in excessively large quantity. Accordingly, the content is set to 0 to 30 percent, desirably 1 to 27 percent, preferably 2 to 25 percent.

$LiO_2$ is an essential component having the functions of increasing the refractive index and lowering the glass transition temperature more efficiently than other alkali metal oxides. It also improves the meltability of the glass. When incorporated in excessively small quantity, these effects are compromised; when incorporated in excessively large quantity, the resistance to devitrification of the glass decreases, it becomes difficult to directly mold high-quality preforms from a glass melt flow, and weatherability deteriorates. Accordingly, the content is set to 1 to 25 percent, desirably 2 to 20 percent, and preferably, 3 to 18 percent.

From the perspectives of the glass transition temperature and the stability of the glass, it is desirable to optimize the ratio of $Li_2O$ to the network-forming components; thus, the molar ratio of $Li_2O/(B_2O_3+SiO_2)$ is desirably set to the range of 0.02 to 0.25, preferably to the range of 0.04 to 0.20, and more preferably, to the range of 0.06 to 0.18.

ZnO is a component functioning to lower the melting temperature, liquidus temperature, and glass transition temperature; enhance the chemical durability and weatherability of the glass; and raise the refractive index. However, when incorporated in excessively large quantity, it becomes difficult to maintain an Abbé number $v_d$ of 50 or greater. Thus, the content is set to 0 to 20 percent, desirably 0 to 16 percent, and more preferably, 1 to 14 percent.

To achieve the desired low temperature softening property in the optical glass of the present invention, it is desirable for the combined content of $Li_2O$ and ZnO ($Li_2O+ZnO$) to be 2 percent or greater. However, when this combined content is excessively high, the resistance of the glass to devitrification decreases and dispersion increases. Thus, $Li_2O+ZnO$ is desirably set to 2 to 30 percent, preferably 3 to 25 percent, and more preferably, 4 to 23 percent.

To maintain an Abbé number $v_d$ of 50 or greater while imparting the desired low temperature softening property, the molar ratio of $ZnO/Li_2O$ is desirably set to 6 or less, preferably 0 to 5, and more preferably 0.2 to 4.

$La_2O_3$ is an essential component that functions to enhance durability and weatherability while maintaining a low dispersion property and raising the refractive index. However, when introduced in excessively high quantity, it lowers the stability of the glass and raises the glass transition temperature. Thus, the content is set to 4 to 30 percent, desirably 4 to 25 percent, preferably 5 to 22 percent, and more preferably, 6 to 20 percent.

$Gd_2O_3$ is an essential component functioning in the same manner as $La_2O_3$. However, when incorporated in excessively high quantity, it lowers the stability of the glass and raises the glass transition temperature. Thus, the content is set to 1 to 25 percent, desirably 1 to 20 percent, preferably 1 to 18 percent, more preferably 2 to 18 percent, and still more preferably, 3 to 16 percent.

From the perspective of increasing the stability of the glass, the ratio of $La_2O_3$ to $Gd_2O_3$ is desirably adjusted. As a molar ratio, $La_2O_3/Gd_2O_3$ desirably falls within a range of 0.5 to 5.0, preferably a range of 0.8 to 4.8, more preferably range of 0.8 to 4.6, still more preferably a range of 0.9 to 4.4, and still more preferably, a range of 1.0 to 4.2.

$Y_2O_3$ is an optional component functioning in the same manner as $La_2O_3$ and $Gd_2O_3$. The incorporation of a small quantity advantageously raises the heat resistance of the glass and lowers the liquidus temperature. However, the incorporation of an excessively large quantity lowers the stability of the glass and raises the glass transition temperature. Thus, the content is set to 0 to 20 percent, desirably 0.1 to 20 percent, preferably 0.2 to 20 percent, more preferably 0.3 to 20 percent, still more preferably 0.3 to 15 percent, and still more preferably, 0.3 to 10 percent. To achieve a particularly high refractive index of $n_d \geq 1.7$ and low dispersion property of $v_d \geq 52$, the content is desirably 0.5 to 20 percent, preferably 0.5 to 15 percent, and more preferably, 1 to 12 percent. To achieve good thermal stability in the glass while maintaining a high refractive index and a low dispersion property, $Y_2O_3$ is desirably incorporated as an essential component.

The optical glass of the present invention desirably comprises glass components in the form of $La_2O_3$, $Gd_2O_3$, and $Y_2O_3$ in combination. Incorporating three or more of such rare earth oxide components heightens the stability of the glass more than when two or fewer rare earth oxide components are employed.

$ZrO_2$ is an optional component that can be incorporated to enhance the weatherability of the glass and adjust optical constants. The incorporation of a small quantity functions to enhance the stability of the glass. However, the incorporation of an excessively large quantity decreases the stability of the glass and increases dispersion. Thus, the content is desirably 0 to 5 percent, preferably 0 to 4.5 percent, and more preferably, 0 to 4 percent. To achieve a particularly high refractive index of $n_d \geq 1.7$ and low dispersion property of $v_d \geq 52$, the content is desirably 0 to 3 percent, preferably 0 to 2 percent, more preferably 0 to 1.5 percent, and still more preferably, 0 to 0.5 percent.

When MgO is incorporated instead of ZnO or $Li_2O$, low glass dispersion and high chemical durability of the glass can be achieved. However, incorporation in excessively high quantity lowers the refractive index and raises the glass transition temperature. Thus, the content is set to 0 to 25 percent, desirably 0 to 20 percent, and preferably 0 to 15 percent.

CaO lowers the glass transition temperature and adjusts optical characteristics. However, incorporation in excessively large quantity lowers the stability of the glass and raises the liquidus temperature. Thus, the content is set to 0 to 15 percent, desirably 0.2 to 14 percent, and preferably, 0.5 to 12 percent.

SrO enhances chemical durability and adjusts optical characteristics. However, incorporation in excessively high quantity lowers the stability of the glass and raises the liquidus temperature. Thus, the content is set to 0 to 10 percent, desirably 0 to 5 percent, and preferably, 0 to 3 percent.

From the perspectives of raising the refractive index and lowering the dispersion of the optical glass of the present invention, the molar ratio $\{ZnO/(La_2O_3+Gd_2O_3+Y_2O_3)\}$ is set to 0.8 or less. When this molar ratio exceeds 0.8, it becomes difficult to achieve desired optical constants. This molar ratio is desirably 0.75 or less, preferably 0.7 or less, more preferably 0.65 or less, and still more preferably 0.6 or less.

The incorporation of components having an ion radius that is smaller than that of components having a large ion radius as alkaline earth components is desirable from the perspective of simultaneously achieving both an $n_d \geq 1.7$ and glass stability. Thus, in the optical glass of the present invention, the molar ratio $\{(CaO+SrO+BaO)/(La_2O_3+Gd_2O_3+Y_2O_3)\}$ is 0.8 or less. When this molar ratio exceeds 0.8, it becomes difficult to simultaneously achieve both a high refractive index and glass stability. This molar ratio is desirably 0.6 or less, preferably 0.5 or less, and more preferably, 0.4 or less.

In the optical glass of the present invention, the combined content of the above components is set to 97 percent or greater. When components other than the above-described components are incorporated in large quantity into the optical glass of the present invention, problems such as loss of the low dispersion property, loss of the high refractive index property, and loss of glass stability are encountered. Thus, the total content of the above-described components is desirably high. The above combined content is desirably 98 percent or greater, preferably 99 percent or greater, and more preferably, 100 percent.

Examples of other components are $Ta_2O_5$, F, $Al_2O_3$, $Yb_2O_3$, $Sc_2O_3$, and $Lu_2O_3$.

$Ta_2O_5$ functions to raise the refractive index, but also increases dispersion. Thus, the quantity incorporated is controlled. In the optical glass of the present invention, the components that raise the refractive index—$La_2O_3$, $Gd_2O_3$, $Y_2O_3$, $ZrO_2$, and $Ta_2O_5$—are divided into a group that maintains a low dispersion property ($La_2O_3$, $Gd_2O_3$, and $Y_2O_3$) and a group that increases dispersion ($ZrO_2$ and $Ta_2O_5$). The quantity of optional component $Ta_2O_5$ incorporated is limited by optimizing the ratio of the total quantity of each group. That is, in the optical glass of the present invention, the molar ratio of $\{(ZrO_2+Ta_2O_5)/(La_2O_3+Gd_2O_3+Y_2O_3)\}$ is set to 0.4 or less. When this molar ratio exceeds 0.4, it becomes difficult to maintain a low dispersion property. This molar ratio is desirably 0.3 or lower, preferably 0.27 or lower, more preferably 0.255 or lower, more preferably 0.225 or lower, still more preferably 0.2 or lower, still more preferably 0.18 or lower, still more preferably 0.1 or lower, still more preferably 0.05 or lower, and most preferably, zero.

For the above-stated reasons, the $Ta_2O_5$ content is desirably kept to within a range of 0 to 3 percent, preferably 0 to 2 percent, more preferably 0 to 1 percent, still more preferably 0 to 0.5 percent, still more preferably 0 to 0.2 percent, still more preferably 0 to 0.1 percent, and most preferably, zero.

To improve the thermal stability of the glass while maintaining a high refractive index and a low dispersion property, it is desirable to: incorporate $Y_2O_3$ as set forth above as an essential component; keep $\{(ZrO_2+Ta_2O_5)/La_2O_3+Gd_2O_3+Y_2O_3)\}$ low; reduce the content of $Ta_2O_5$; or not incorporate $Ta_2O_5$.

In the composition of a $B_2O_3$—$La_2O_3$ system, in terms of optical characteristics, fluorine increases the range over which vitrification is possible and lowers the glass transition temperature. However, when present with $B_2O_3$, fluorine exhibits marked volatization at high temperatures, volatizing during melting of the glass and during molding. It thus renders difficult the mass production of glass having a constant refractive index. Further, volatile matter from the glass adheres to the pressing mold during precision press molding. When such a mold is repeatedly employed, there is a problem in that the surface precision of the lenses decreases. Accordingly, the content of fluorine is desirably kept to 10 percent or less, preferably to 5 percent or less. In methods of directly molding preforms from glass melt, striae due to volatization occur, making it difficult to obtain an optically homogeneous preform. Thus, the content of fluorine is desirably kept to 3 percent or less, with no incorporation being preferred.

$Al_2O_3$ serves to enhance chemical durability. However, when incorporated in excessively high quantity, it lowers the refractive index and raises the glass transition temperature.

Accordingly, the content is desirably 0 to 10 percent, preferably 0 to 8 percent, and more preferably, 0 to 5 percent.

$Sc_2O_3$ functions in the same manner as $La_2O_3$, $Gd_2O_3$, and $Y_2O_3$. The incorporation of a small quantity advantageously increases the thermal stability of the glass and lowers the liquidus temperature. However, these advantages are lost, the stability of the glass decreases, and the refractive index drops with the incorporation of an excessive quantity. $Sc_2O_3$ is an expensive component and is desirably not employed from the perspective of cost, depending on the industrial application. On this basis, the quantity is desirably 0 to 20 percent, preferably 0 to 18 percent, more preferably 0 to 13 percent, still more preferably 0.1 to 10 percent, and most preferably, 0.1 to 5 percent.

$Yb_2O_3$ and $Lu_2O_3$ can each be incorporated. However, they reduce the thermal stability of the glass and greatly increase the liquidus temperature. Thus, the content of $Yb_2O_3$ is kept to within the range of 0 to 5 percent, preferably 0 to 2 percent, more preferably 0 to 1 percent, and still more preferably, 0 to 0.5 percent. The content of $Lu_2O_3$, as well, is kept to within the range of 0 to 5 percent, preferably 0 to 2 percent, more preferably 0 to 1 percent, and still more preferably, 0 to 0.5 percent. Both $Yb_2O_3$ and $Lu_2O_3$ are expensive components and need not necessarily be employed in the optical glass of the present invention. Thus, from the perspective of cost, both $Yb_2O_3$ and $Lu_2O_3$ are desirably not incorporated.

$GeO_2$ may be incorporated in a range of 0 to 10 percent, for example. Since it is an expensive component, the quantity incorporated is desirably kept to 5 percent or less, with no incorporation being preferred.

BaO greatly reduces the stability of the glass when incorporated in small quantity. Thus, the content is desirably limited to 2 percent or less, with no incorporation being preferred.

$Nb_2O_5$ and $TiO_2$ both have the effect of strongly increasing dispersion and greatly raising the Abbé number $nu_d$ when incorporated in only small quantities. Thus, to maintain an Abbé number $v_d$ of 50 or greater, the quantity of $Nb_2O_3$ is desirably kept to 2 percent or less, preferably 1 percent or less, with no incorporation at all being preferred overall. To maintain an Abbé number $v_d$ of 50 or greater, the quantity of $TiO_2$ is desirably kept to 2 percent or less, preferably 1 percent or less, with no incorporation at all being preferred overall.

$WO_3$ and $Bi_2O_3$ both have the same effects as $Nb_2O_5$ and $TiO_2$. Thus, the quantity of each employed is desirably kept to 2 percent or less, preferably 1 percent or less, with no incorporation at all being preferred overall.

Not only do $Nb_2O_5$, $TiO_2$, $WO_3$, and $Bi_2O_3$ all increase dispersion, but they also increase coloration of the glass. Since the optical glass of the present invention, as is the case for optical glass in general, has good light transparency, it is desirable not to incorporate $Nb_2O_5$, $TiO_2$, $WO_3$, and $Bi_2O_3$ to avoid using such substances.

When negative effects on the environment are considered, the incorporation of Pb, Cr, Cd, As, Th, Te, and U is avoided. Pb has been conventionally employed as a main component to raise the refractive index of optical glass. However, in addition to the above problem, lead is readily reduced during precision press molding in a nonoxidizing gas atmosphere, with precipitating metallic lead adhering to the molding surfaces of the pressing mold and causing problems such as reducing the surface precision of the press molded product. $As_2O_3$ has also been conventionally added as a clarifying agent, but in addition to the above-described problems, causes problems by oxidizing the molding surface of the pressing mold and shortening the service life of the mold. Thus, it is not incorporated.

Substances that color the glass, such as Fe, Cu, and Co, are desirably not incorporated unless with the object of imparting desired spectral characteristics to the glass.

$Sb_2O_3$ is an optional additive employed as a clarifying agent. The addition of a small quantity diminishes absorption by reducing impurities such as Fe and suppresses coloration of the glass. However, the addition of an excessively large quantity both results in the loss of this effect and oxidizes the molding surface of the pressing mold during precision press molding, negatively affecting the service life of the pressing mold. Such addition is thus undesirable for precision press molding. Accordingly, as an externally calculated ratio, the quantity added is desirably 0 to 0.5 weight percent, preferably 0 to 0.2 weight percent.

The optical glass of the present invention has a refractive index $n_d$ of 1.70 or greater and an Abbé number $v_d$ of 50 or more. Glasses having optical constants falling within these ranges that are employed as materials for optical elements desirably have relatively high refractive indexes and relatively low dispersion (high Abbé numbers). Additionally, when the refractive index is raised and the dispersion is lowered while maintaining a low glass transition temperature, the stability of the glass decreases markedly. Thus, it has conventionally been difficult to raise the refractive index and lower dispersion even further in this range. By contrast, since the optical glass of the present invention is optimized as a glass for precision press molding, it is possible to achieve a refractive index $n_d$ and Abbé number $v_d$ satisfying equation (1) below:

$$n_d \geq 2.235 - 0.1 \times v_d \quad (1)$$

When directly molding preforms for precision press molding from glass melt gobs, an excessively high refractive index and an excessively low dispersion are undesirable in order to maintain good glass stability. The optical properties are desirably set to ranges satisfying equation (2) below, and preferably set to ranges satisfying equation (3) below. However, even in these cases, the setting of optical properties to ranges satisfying equation (1) is preferred.

$$n_d \geq 2.285 - 0.1 \times v_d \quad (2)$$

$$n_d \geq 2.275 - 0.1 \times v_d \quad (3)$$

The optical glass of the present invention is a low dispersion glass with an Abbé number $v_d$ of 50 or greater. From the perspective of a low glass dispersion property, the Abbé number $v_d$ is desirably 51 or greater, preferably 52 or greater, more preferably 52.5 or greater, still more preferably 53 or greater, and most preferably, 54 or greater.

The optical glass of the present invention can achieve a low glass transition temperature suited to precision press molding. The glass transition temperature desirably falls within a range of 635° C. and below, preferably 620° C. and below. However, when the glass transition temperature is excessively low, higher refractive indexes and lower dispersion become harder to achieve, and/or the stability and chemical durability of the glass tends to decrease. Thus, the glass transition temperature is desirably 535° C. or above, preferably 555° C. or above, and more preferably, 565° C. or above.

The optical glass of the present invention has good glass stability. For example, taking the stability in the high temperature range required for molding glass from glass melt as a yardstick, glass having a liquidus temperature of 1090° C. or lower can be achieved. In this manner, in the optical glass of the present invention, it is possible to keep the liquidus temperature below a prescribed temperature in a high refractive index, low dispersion glass. Thus, it is possible to directly mold preforms for precision press molding from glass melt. The liquidus temperature desirably falls within a range of 1060° C. and below, preferably 1050° C. and below, and more preferably, 1040° C. and below.

As set forth above, the optical glass of the present invention exhibits good light transparency. Quantitatively, a low degree of coloration is realized in the form of a $\lambda_{80}$ (nm) that is, for example, 410 nm or lower, desirably 400 nm or lower, preferably 390 nm or lower, more preferably 380 nm or lower, still more preferably 370 or lower, still more preferably 360 or lower, and still more preferably, 350 or lower. $\lambda_{80}$ (nm) is calculated as follows. A glass sample having optically polished parallel flat surfaces that are 10.0±0.1 mm in thickness is employed. Intense light Iin is directed perpendicularly onto one of the flat surfaces, the intensity of the light Iout exiting from the other flat surface is measured, and the external transmittance (Iout/Iin) is calculated. The external transmittance is measured over the wavelength range of 280 to 700 nm. $\lambda_{80}$ (nm) is the wavelength at which the external transmittance reaches 80 percent. Common optical glass to which coloring agents are not added, such as the optical glass of the present invention, exhibit little absorption on the long wavelength side at the absorption end from the ultraviolet to the visible region. Thus, in a glass sample having optically polished parallel flat surfaces with a thickness of 10.0±0.1 mm, an internal transmittance exceeding 80 percent is obtained over the wavelength region from $\lambda_{80}$ (nm) to 1550 nm. In a glass sample having optically polished parallel flat surfaces with a thickness of 10.0±0.1 mm, an internal transmittance exceeding 90 percent is obtained over the long wavelength region from $\lambda_{80}+20$ (nm) to 1550 nm. The $\lambda_{70}$ (nm) and $\lambda_5$ (nm) in Table 1 below are wavelengths with external transmittances of 70 percent and 5 percent, respectively, that were calculated based on the $\lambda_{80}$ method.

The optical glass of the present invention is suitable as a material for lenses used to configure image pickup optical systems, as well as being suitable as a material for lenses used to configure optical systems employed in the recording and reproduction of optical disks such as DVDs and CDs. As an example, the optical glass of the present invention is suitable as a material for optical elements employed to record and reproduce data with blue-violet light (for example, a semiconductor laser beam with a wavelength of 405 nm) to achieve excellent optical transparency. Specifically, for example, it is suited to objective lenses for DVDs with a high recording density of 23 GB. Aspherical lenses with numerical apertures of 0.85 are currently the mainstream in such objective lenses. Such lenses have a high ratio of center thickness to effective diameter; however, the optical glass of the present invention permits a reduction in this ratio by having a high refractive index while maintaining a low dispersion property. Since the thickness of lenses passing blue-violet light can be diminished, the loss of blue-violet light can be reduced while maintaining good light transparency in the glass. Further, a reduction in the ratio of the center thickness to the effective diameter is desirable for precision press molding. That is, the volume of the preform employed in precision press molding is determined by the volume of the lens. Since the above objective lenses are small, the preforms employed in molding may be spherical or ellipsoids of revolution. When employing a spherical preform and the curvature of the convex surface of the lens is high (the radius of curvature is small), atmospheric gas becomes trapped between the pressing mold and the glass, and a problem called gas trapping, where the gas does not diffuse, tends to occur in such spots. Reducing the ratio of the center thickness to the effective diameter is linked to increasing the curvature of the convex surface of the lens, and is thus desirable when fabricating lenses of high surface precision by precision press molding.

The method for manufacturing the optical glass of the present invention will be described next. The optical glass of the present invention can be manufactured by heating and melting glass starting materials. The glass starting materials may be in the form of suitable carbonates, nitrates, oxides, and the like. These starting materials are weighed out in prescribed proportions and mixed to obtain a blended starting material. This blended starting material is then charged to a melting furnace that has been heated to 1,200 to 1,300° C., for example, and melted, clarified, stirred, and homogenized to obtain a homogeneous glass melt free of bubbles and unmelted matter. The glass melt is molded and gradually cooled to obtain the optical glass of the present invention.

[Preform for Precision Press Molding and Method for Manufacturing Preforms for Precision Press Molding]

The preform for precision press molding and method for manufacturing preforms for precision press molding of the present invention will be described next. The preform for precision press molding can be referred to as the precision press molding preform or simply as the preform.

The preform is a molded glass member equal in weight to a precision press molded article. The preform is molded into a suitable shape corresponding to the shape of a precision press molded article. Examples of such shapes are spheroids and ellipsoids of revolution. The preform is heated to a temperature at which it exhibits a viscosity permitting precision press molding and is then precision press molded.

The preform for precision press molding of the present invention is comprised of the above-described optical glass of the present invention. As needed, the surface of the preform of the present invention may be provided with a thin film such as a mold release agent. The preform permits precision press molding of optical elements having desired optical constants. Since the glass is stable in the high temperature range and the viscosity of the glass melt when flowing out can be increased, in methods of molding preforms in a step of cooling a glass gob obtained by separation from a glass melt caused to flow out of a pipe, an advantage is afforded in that high-quality preforms can be manufactured with high productivity.

The method for manufacturing preforms for precision press molding of the present invention, one way of manufacturing the preform of the present invention, is a method for manufacturing preforms for precision press molding that are comprised of the optical glass of the present invention by separating glass melt gobs from an outflowing glass melt and molding the glass melt gobs into preforms for precision press molding in a cooling step. Specifically, it is a manufacturing method for molding preforms of prescribed weight by the steps of separating glass melt gobs of prescribed weight from a glass melt flow exiting a pipe or the like and cooling the glass gobs. This method is advantageous in that no mechanical processing such as cutting, grinding, or polishing is required. Mechanically processed preforms are annealed prior to mechanical processing to reduce distortion of the glass to a degree at which the glass will not be damaged. However, annealing to prevent damage is not required by the above method. Further, preforms with smooth surfaces can also be molded. In this method, from the perspective of imparting smooth, clean surfaces, the preforms are desirably floated by applying wind pressure. Further, the outer surfaces of the preforms are desirably comprised of free surfaces. Still further, preforms free of cutting traces known as shear marks are desirable. Shear marks are produced when the outflowing glass melt is cut with a blade. When shear marks remain at the stage of molding precision press molded articles, they end up becoming defects. Thus, shear marks are desirably removed by the preform stage. Methods of separating glass melt without producing shear marks include: the method of dripping glass melt from an outflow pipe, and the method of supporting the front end portion of a glass melt flow as it flows out of an outflow pipe and removing this support at a timing permitting the separation of a glass melt gob of prescribed weight (referred to as the "drop cut method" hereinafter). In the drop cut method, the glass can be separated at a constriction formed between the front end of the glass melt flow and the end of the outflow pipe to obtain a glass melt gob of prescribed weight. The glass melt gob obtained is then molded while still soft into a suitable shape for feed into a pressing mold.

The preform of the present invention can be manufactured by forming molded glass members out of glass melt, and then cutting or breaking; grinding; and polishing these molded members. In this method, a preform of desired weight is fabricated by molding a molded glass member comprised of the above-described optical glass by causing a glass melt to flow into a casting mold, and then mechanically processing the molded glass member. Prior to conducting mechanical processing, relatively thorough processing to relieve distortion is desirably conducted by annealing the glass to prevent damaging the glass.

[Optical Element and Method for Manufacturing Optical Elements]

The optical element of the present invention is comprised of the above-described optical glass of the present invention. The optical element of the present invention is characterized by a high refractive index and low dispersion in the same manner as the optical glass of the present invention constituting the optical element.

Examples of the optical element of the present invention are various lenses such as spherical lenses, aspherical lenses, and microlenses; diffraction gratings; lenses with diffraction gratings; lens arrays; and prisms. From the viewpoint of applications, examples are: the lenses constituting image pickup optical systems such as digital still cameras, digital video cameras, single-lens reflex cameras, cameras mounted on portable telephones, and vehicle-mounted cameras; and lenses constituting optical systems for reading and writing data to and from optical disks such as DVDs and CDs (for example, the above-described objective lenses).

The above-described optical element is desirably obtained by heat softening and precision press molding the preform of the present invention.

As needed, an optical thin film such as an antireflective film, fully reflective film, partially reflective film, or a film having spectral properties may be provided on the optical element.

The method for manufacturing optical elements of the present invention will be described next.

In the method for manufacturing optical elements of the present invention, the preform of the present invention or a preform for precision press molding manufactured by the method for manufacturing preforms of the present invention is heated and precision press molded to produce an optical element.

The precision press molding method, also known as the mold optics molding method, is already well known in the field of art to which the present invention pertains.

Any surface of an optical element that transmits, refracts, diffracts, or reflects rays of light is called an optically functional surface. In the example of a lens, lens surfaces such as the aspherical surface of an aspherical lens and the spherical surface of a spherical lens both correspond to optically functional surfaces. In precision press molding, the molding surface of the pressing mold is precisely transferred to the glass to form an optically functional surface by press molding. That is, to finish an optically functional surface, no mechanical processing such as grinding or polishing is required.

Accordingly, the method for manufacturing optical elements of the present invention is suited to the manufacturing of optical elements such as lenses, lens arrays, diffraction gratings, and prisms, and is optimal for the manufacturing of aspherical lenses with high productivity.

The method for manufacturing optical elements of the present invention permits the manufacturing of optical elements having the above-described optical properties and permits adjustment of the glass composition as set forth above to impart low temperature processing properties to the preform, thereby permitting press molding of the glass at relatively low temperature. Thus, the load on the molding surface of the pressing mold is reduced and the service lifetime of the pressing mold (or mold release film when a mold release film is provided on the molding surface) is extended. Adjustment of the glass composition increases the stability of the glass constituting the preform, making it possible to effectively prevent devitrification of the glass during the reheating and pressing steps. Further, the entire series of steps from melting the glass to obtaining the final product can be conducted with high productivity.

A known pressing mold may be employed for precision press molding, such as a mold made of a material such as silicon carbide, an ultrahard material, or stainless steel having molding surfaces that have been coated with a mold release film. The mold release film employed may be a carbon-containing film, a noble metal alloy film, or the like. The pressing mold is equipped with upper and lower molds, and as necessary, a drum mold. Of these, to effectively reduce or prevent damage to glass molded articles during press molding, the use of a pressing mold comprised of silicon carbide or an ultrahard alloy (particularly one made of an ultrahard alloy not containing binder, such as a pressing mold made of WC) is desirable. The providing of a mold release film in the form of a carbon-containing film on the molding surface of the mold is also desirable.

Precision press molding is desirably conducted using a non-oxidizing gas atmosphere during molding to keep the molding surfaces of the pressing mold in good condition. Examples of preferred non-oxidizing gases are nitrogen and mixtures of nitrogen and hydrogen. Particularly when employing a pressing mold with molding surfaces equipped with a mold release film in the form of a carbon-containing film and when employing a pressing mold comprised of silicon carbide, it is necessary to conduct precision press molding in such a non-oxidizing atmosphere.

Precision press molding methods particularly suited to the method for manufacturing an optical element of the present invention will be described next.

(Precision Press Molding Method 1)

In this method, a preform is introduced to the pressing mold, the pressing mold and preform are both heated, and precision press molding is conducted ("Precision Press Molding Method 1" hereinafter).

In Precision Press Molding Method 1, the pressing mold and preform are both desirably heated to a temperature at which the glass constituting the preform exhibits a viscosity of $10^6$ to $10^{12}$ dPa·s to conduct precision press molding.

The precision press molded article is desirably removed from the pressing mold after being cooled to a temperature at which the glass exhibits a viscosity of $10^{12}$ dPa·s or more, preferably $10^{14}$ dPa·s or more, and more preferably, $10^{16}$ dPa·s or more.

Under these conditions, the shape of the molding surfaces of the pressing mold can be precisely transferred to the glass and the precision press molded article can be removed without deformation.

(Precision Press Molding Method 2)

This method is characterized in that a preform that has been heated to one temperature is introduced into a pressing mold that has been preheated to another temperature and the preform is precision press molded ("Precision Press Molding Method 2" hereinafter). This method allows the preform to be preheated prior to being introduced into the pressing mold, thereby shortening the cycle time and permitting the manufacturing of optical elements that have good surface precision and are free of surface defects.

The temperature to which the pressing mold is preheated is desirably lower than that to which the preform is preheated. Such preheating keeps down the temperature to which the pressing mold is heated, thereby reducing wear and tear on the pressing mold.

In Precision Press Molding Method 2, the preform is desirably preheated to a temperature at which the glass constituting the preform exhibits a viscosity of $10^9$ dPa·s or less, preferably $10^9$ dPa·s.

Further, the preform is desirably preheated while being floated; preheating is preferably conducted to a temperature at which the glass constituting the preform exhibits a viscosity of $10^{5.5}$ to $10^9$ dPa·s, more preferably greater than or equal to $10^{5.5}$ but less than $10^9$ dPa·s.

Cooling of the glass is desirably begun simultaneously with the start of, or during, pressing.

The temperature of the pressing mold is desirably adjusted to below the temperature to which the preform is preheated. It suffices to use a temperature at which the glass exhibits a viscosity of $10^9$ to $10^{12}$ dPa·s as yardstick.

In this method, the press molded article is desirably removed from the mold after being cooled to a temperature at which the glass exhibits a viscosity of $10^{12}$ dPa·s or more following press molding.

The optical element that has been precision press molded is removed from the pressing mold and gradually cooled as necessary. When the molded article is an optical element such as a lens, an optical film may be coated on the surface thereof as needed.

EXAMPLES

The present invention will be further described below through examples. However, the present invention is not limited to the forms shown in the examples.

Manufacturing Optical Glass

Table 1 shows the compositions of the glasses of examples 1 to 30. For each of these glasses, starting materials of the various components in the form of corresponding oxides, hydroxides, carbonates, and nitrates were weighed out to yield the compositions shown in Table 1 following vitrification, thoroughly mixed, charged to a platinum crucible, melted at a temperature range of from 1,200 to 1,300° C. in an electric furnace, homogenized by stirring, and clarified. They were then cast into a metal mold that had been preheated to suitable temperature. The cast glass was cooled to the glass transition temperature and then immediately placed in an annealing furnace, where it was gradually cooled to room temperature to obtain the optical glass.

The refractive index ($n_d$), Abbé number ($v_d$), specific gravity, glass transition temperature, and liquidus temperature of the various glasses obtained by the above method were measured by the following methods. The results are given in Table 1. Additionally, the $\lambda_{80}$, $\lambda_{70}$, and $\lambda_5$ of the optical glasses of examples 1 to 17 were measured by the above-described methods; the results are given in Table 1.

(1) Refractive index ($n_d$) and Abbé number ($v_d$)

Measured for optical glasses obtained by cooling at a gradual temperature reduction rate of 30° C./hour.

(2) Glass Transition Temperature ($T_g$)

Measured at a rate of temperature increase of 4° C./minute with a thermomechanical analyzer made by Rikagu Denki K.K.

(3) Specific Gravity

Calculated by Archimedes' method.

(4) Liquidus Temperature (L. T.)

Roughly 50-gram glass samples were charged to a platinum crucible and melted for about 15 to 60 minutes at about 1,200 to 1,300° C. The glass samples were then maintained for about 2 hours at 980° C., 990° C., 1000° C., 1010° C., 1020° C., 1030° C., 1040° C., 1050° C., 1060° C., 1070° C., 1080° C., 1090° C., or 1100° C., respectively; and cooled while observing with a microscope whether or not crystals precipitated. The lowest temperature at which crystals were not observed was adopted as the liquidus temperature (L.T.).

TABLE 1

| | $B_2O_3$ | $SiO_2$ | $Li_2O$ | ZnO | $La_2O_3$ | $Gd_2O_3$ | $Y_2O_3$ | $ZrO_2$ |
|---|---|---|---|---|---|---|---|---|
| Ex. 1 | 50.50 | 11.00 | 8.00 | 8.80 | 10.00 | 2.50 | 3.50 | 1.20 |
| Ex. 2 | 50.50 | 11.00 | 7.50 | 8.80 | 10.00 | 2.50 | 3.50 | 1.20 |
| Ex. 3 | 50.00 | 11.00 | 9.00 | 8.80 | 9.50 | 3.50 | 3.00 | 1.20 |
| Ex. 4 | 48.06 | 11.65 | 9.22 | 10.00 | 9.32 | 3.01 | 3.40 | 0.97 |
| Ex. 5 | 44.00 | 15.50 | 8.00 | 11.00 | 9.50 | 4.00 | 2.00 | 1.00 |
| Ex. 6 | 44.50 | 15.00 | 8.00 | 11.00 | 8.50 | 5.80 | 2.00 | 0.20 |
| Ex. 7 | 46.00 | 14.50 | 8.00 | 11.00 | 8.50 | 5.50 | 2.00 | 0.00 |
| Ex. 8 | 46.03 | 13.86 | 7.92 | 10.89 | 8.42 | 5.45 | 1.98 | 0.00 |
| Ex. 9 | 51.00 | 7.00 | 4.50 | 12.50 | 10.50 | 7.00 | 1.00 | 4.00 |
| Ex. 10 | 51.00 | 7.00 | 4.50 | 10.00 | 10.50 | 7.00 | 1.00 | 4.00 |
| Ex. 11 | 51.00 | 7.00 | 5.50 | 5.00 | 10.50 | 7.00 | 1.00 | 4.00 |
| Ex. 12 | 52.67 | 7.53 | 4.84 | 5.38 | 11.29 | 7.53 | 1.08 | 4.30 |
| Ex. 13 | 56.66 | 7.78 | 5.00 | 5.56 | 11.67 | 7.78 | 1.11 | 4.44 |
| Ex. 14 | 61.14 | 7.25 | 4.66 | 5.18 | 10.88 | 8.81 | 1.04 | 1.04 |
| Ex. 15 | 61.45 | 7.29 | 4.69 | 5.21 | 10.94 | 9.38 | 1.04 | 0.00 |
| Ex. 16 | 50.29 | 12.29 | 5.03 | 5.59 | 12.85 | 6.70 | 2.23 | 2.23 |
| Ex. 17 | 52.09 | 7.64 | 3.81 | 11.61 | 11.10 | 7.72 | 1.05 | 3.57 |
| Ex. 18 | 51.41 | 8.04 | 4.00 | 11.67 | 11.44 | 7.91 | 1.18 | 4.11 |
| Ex. 19 | 51.21 | 8.00 | 3.98 | 11.62 | 11.14 | 7.70 | 1.15 | 4.97 |
| Ex. 20 | 52.08 | 8.07 | 4.02 | 9.96 | 11.49 | 7.94 | 1.19 | 4.13 |
| Ex. 21 | 52.09 | 8.07 | 4.20 | 10.84 | 11.39 | 7.87 | 1.18 | 3.24 |
| Ex. 22 | 52.08 | 8.18 | 4.10 | 10.83 | 11.43 | 7.90 | 1.18 | 3.24 |
| Ex. 23 | 52.56 | 8.07 | 4.02 | 11.73 | 11.24 | 7.77 | 1.16 | 1.41 |
| Ex. 24 | 51.61 | 8.52 | 4.10 | 10.81 | 11.51 | 7.96 | 1.19 | 3.24 |
| Ex. 25 | 51.58 | 8.33 | 4.09 | 11.16 | 11.63 | 7.74 | 1.18 | 3.23 |
| Ex. 26 | 58.70 | 6.96 | 8.46 | 4.97 | 10.45 | 8.46 | 1.00 | 1.00 |
| Ex. 27 | 58.50 | 8.36 | 6.96 | 5.01 | 10.68 | 8.54 | 1.02 | 0.93 |
| Ex. 28 | 59.07 | 7.62 | 6.67 | 5.15 | 11.08 | 8.87 | 1.06 | 0.48 |
| Ex. 29 | 59.98 | 7.50 | 6.56 | 5.06 | 11.03 | 8.82 | 1.05 | 0.00 |
| Ex. 30 | 61.67 | 5.65 | 5.65 | 6.03 | 11.08 | 8.86 | 1.06 | 0.00 |

| | MgO | CaO | SrO | BaO | $Ta_2O_5$ | Total |
|---|---|---|---|---|---|---|
| Ex. 1 | 0.00 | 4.50 | 0.00 | 0.00 | 0.00 | 100.00 |
| Ex. 2 | 0.00 | 5.00 | 0.00 | 0.00 | 0.00 | 100.00 |
| Ex. 3 | 0.00 | 4.00 | 0.00 | 0.00 | 0.00 | 100.00 |
| Ex. 4 | 0.00 | 4.37 | 0.00 | 0.00 | 0.00 | 100.00 |
| Ex. 5 | 0.00 | 5.00 | 0.00 | 0.00 | 0.00 | 100.00 |
| Ex. 6 | 0.00 | 5.00 | 0.00 | 0.00 | 0.00 | 100.00 |
| Ex. 7 | 0.00 | 4.50 | 0.00 | 0.00 | 0.00 | 100.00 |
| Ex. 8 | 0.00 | 5.45 | 0.00 | 0.00 | 0.00 | 100.00 |
| Ex. 9 | 2.50 | 0.00 | 0.00 | 0.00 | 0.00 | 100.00 |
| Ex. 10 | 5.00 | 0.00 | 0.00 | 0.00 | 0.00 | 100.00 |
| Ex. 11 | 9.00 | 0.00 | 0.00 | 0.00 | 0.00 | 100.00 |
| Ex. 12 | 5.38 | 0.00 | 0.00 | 0.00 | 0.00 | 100.00 |
| Ex. 13 | 0.00 | 0.00 | 0.00 | 0.00 | 0.00 | 100.00 |
| Ex. 14 | 0.00 | 0.00 | 0.00 | 0.00 | 0.00 | 100.00 |
| Ex. 15 | 0.00 | 0.00 | 0.00 | 0.00 | 0.00 | 100.00 |
| Ex. 16 | 0.00 | 2.79 | 0.00 | 0.00 | 0.00 | 100.00 |

TABLE 1-continued

| | | | | | |
|---|---|---|---|---|---|
| Ex. 17 | 0.00 | 1.41 | 0.00 | 0.00 | 0.00 | 100.00 |
| Ex. 18 | 0.00 | 0.18 | 0.00 | 0.00 | 0.06 | 100.00 |
| Ex. 19 | 0.00 | 0.18 | 0.00 | 0.00 | 0.05 | 100.00 |
| Ex. 20 | 0.00 | 1.06 | 0.00 | 0.00 | 0.06 | 100.00 |
| Ex. 21 | 0.00 | 1.06 | 0.00 | 0.00 | 0.06 | 100.00 |
| Ex. 22 | 0.00 | 1.06 | 0.00 | 0.00 | 0.00 | 100.00 |
| Ex. 23 | 0.00 | 1.98 | 0.00 | 0.00 | 0.06 | 100.00 |
| Ex. 24 | 0.00 | 1.06 | 0.00 | 0.00 | 0.00 | 100.00 |
| Ex. 25 | 0.00 | 1.06 | 0.00 | 0.00 | 0.00 | 100.00 |
| Ex. 26 | 0.00 | 0.00 | 0.00 | 0.00 | 0.00 | 100.00 |
| Ex. 27 | 0.00 | 0.00 | 0.00 | 0.00 | 0.00 | 100.00 |
| Ex. 28 | 0.00 | 0.00 | 0.00 | 0.00 | 0.00 | 100.00 |
| Ex. 29 | 0.00 | 0.00 | 0.00 | 0.00 | 0.00 | 100.00 |
| Ex. 30 | 0.00 | 0.00 | 0.00 | 0.00 | 0.00 | 100.00 |

| | $ZnO/(La_2O_3 + Gd_2O_3 + Y_2O_3)$ | $(CaO + SrO + BaO)/(La_2O_3 + Gd_2O_3 + Y_2O_3)$ | $(ZrO_2 + Ta_2O_5)/(La_2O_3 + Gd_2O_3 + Y_2O_3)$ |
|---|---|---|---|
| Ex. 1 | 0.55 | 0.28 | 0.08 |
| Ex. 2 | 0.55 | 0.31 | 0.08 |
| Ex. 3 | 0.55 | 0.25 | 0.08 |
| Ex. 4 | 0.64 | 0.28 | 0.06 |
| Ex. 5 | 0.71 | 0.32 | 0.06 |
| Ex. 6 | 0.67 | 0.31 | 0.01 |
| Ex. 7 | 0.69 | 0.28 | 0.00 |
| Ex. 8 | 0.69 | 0.35 | 0.00 |
| Ex. 9 | 0.68 | 0.00 | 0.22 |
| Ex. 10 | 0.54 | 0.00 | 0.22 |
| Ex. 11 | 0.27 | 0.00 | 0.22 |
| Ex. 12 | 0.27 | 0.00 | 0.22 |
| Ex. 13 | 0.27 | 0.00 | 0.22 |
| Ex. 14 | 0.25 | 0.00 | 0.05 |
| Ex. 15 | 0.24 | 0.00 | 0.00 |
| Ex. 16 | 0.26 | 0.13 | 0.10 |
| Ex. 17 | 0.58 | 0.07 | 0.18 |
| Ex. 18 | 0.57 | 0.01 | 0.20 |
| Ex. 19 | 0.58 | 0.01 | 0.25 |
| Ex. 20 | 0.48 | 0.05 | 0.20 |
| Ex. 21 | 0.53 | 0.05 | 0.16 |
| Ex. 22 | 0.53 | 0.052 | 0.16 |
| Ex. 23 | 0.58 | 0.10 | 0.07 |
| Ex. 24 | 0.53 | 0.05 | 0.16 |
| Ex. 25 | 0.54 | 0.05 | 0.16 |
| Ex. 26 | 0.25 | 0.00 | 0.05 |
| Ex. 27 | 0.25 | 0.00 | 0.05 |
| Ex. 28 | 0.25 | 0.00 | 0.02 |
| Ex. 29 | 0.24 | 0.00 | 0.00 |
| Ex. 30 | 0.29 | 0.00 | 0.00 |

| | nd | vd | Tg (° C.) | LT (° C.) | Specific gravity | λ 80 (nm) | λ 70 (nm) | λ 5 (nm) |
|---|---|---|---|---|---|---|---|---|
| Ex. 1 | 1.71287 | 54.13 | 583 | 990 | 3.88 | 363 | 340 | 253 |
| Ex. 2 | 1.71335 | 54.00 | 586 | 990 | 3.88 | 361 | 339 | 254 |
| Ex. 3 | 1.71359 | 53.82 | 571 | 990 | 3.90 | 353 | 333 | 259 |
| Ex. 4 | 1.71364 | 53.50 | 574 | 990 | 3.90 | 356 | 334 | 260 |
| Ex. 5 | 1.71664 | 53.36 | 574 | 1040 | 3.98 | 365 | 341 | 257 |
| Ex. 6 | 1.71757 | 53.55 | 575 | 1020 | 4.06 | 356 | 334 | 261 |
| Ex. 7 | 1.71314 | 53.90 | 573 | 1010 | 4.00 | 357 | 336 | 276 |
| Ex. 8 | 1.71390 | 53.84 | 576 | 1010 | 4.01 | 355 | 335 | 260 |
| Ex. 9 | 1.74679 | 51.33 | 602 | 1000 | 4.32 | 388 | 360 | 293 |
| Ex. 10 | 1.74438 | 51.62 | 606 | 1010 | 4.29 | 389 | 365 | 310 |
| Ex. 11 | 1.73892 | 52.26 | 606 | 1030 | 4.22 | 396 | 374 | 322 |
| Ex. 12 | 1.74523 | 51.93 | 617 | 1030 | 4.29 | 384 | 364 | 311 |
| Ex. 13 | 1.74263 | 52.37 | 624 | 1000 | 4.25 | 359 | 336 | 260 |
| Ex. 14 | 1.72477 | 54.32 | 630 | 1020 | 4.19 | 358 | 338 | 276 |
| Ex. 15 | 1.72387 | 54.51 | 630 | 1030 | 4.21 | 359 | 338 | 276 |
| Ex. 16 | 1.74440 | 52.72 | 614 | 1060 | 4.29 | 364 | 342 | 277 |
| Ex. 17 | 1.75101 | 51.47 | 609 | 1020 | 4.37 | 361 | 338 | 276 |
| Ex. 18 | 1.75491 | 51.01 | 609 | 1030 | 4.41 | — | — | — |
| Ex. 19 | 1.75560 | 50.85 | 608 | 1020 | 4.39 | — | — | — |
| Ex. 20 | 1.75348 | 51.33 | 611 | 1040 | 4.39 | — | — | — |
| Ex. 21 | 1.75017 | 51.56 | 607 | 1030 | 4.37 | — | — | — |
| Ex. 22 | 1.74985 | 51.66 | 608 | 1040 | 4.37 | — | — | — |
| Ex. 23 | 1.74370 | 52.15 | 606 | 1040 | 4.34 | — | — | — |
| Ex. 24 | 1.75047 | 51.65 | 607 | 1040 | 4.38 | — | — | — |
| Ex. 25 | 1.75062 | 51.60 | 612 | 1040 | 4.37 | — | — | — |
| Ex. 26 | 1.72375 | 53.97 | 598 | 1040 | 4.15 | — | — | — |
| Ex. 27 | 1.72393 | 54.27 | 610 | 1040 | 4.17 | — | — | — |
| Ex. 28 | 1.72709 | 54.18 | 609 | 1040 | 4.22 | — | — | — |
| Ex. 29 | 1.72346 | 54.48 | 614 | 1040 | 4.19 | — | — | — |
| Ex. 30 | 1.72443 | 54.43 | 621 | 1040 | 4.19 | — | — | — |

Manufacturing of Preforms for Precision Press Molding

Glass melts corresponding to examples 1 to 30 that had been clarified and homogenized were caused to flow at a constant rate out of a platinum alloy pipe the temperature of which had been adjusted to within a temperature range at which the glass could stably flow without devitrifying. The dripping or drop cut method was employed to separate glass melt gobs equal in weight to the target preforms. The glass melt gobs were received in a receiving mold having gas blowholes in the bottom thereof, and molded into preforms for precision press molding while blowing gas through the blowholes to float the glass gobs. The separation interval of the glass melt was adjusted and set to obtain spherical preforms and oblate spheroidal preforms.

Manufacturing of Optical Elements (Aspherical Lenses)

Preforms obtained by the above-described method were precision press molded with the pressing device shown in FIG. 1 to obtain aspherical lenses. Specifically, a preform was positioned between the lower mold 2 and upper mold 1 of a pressing mold, a nitrogen atmosphere was provided within a quartz tube 11, and a heater (not shown) was turned on to heat the interior of quartz tube 11. The temperature within the pressing mold was set to a temperature at which the glass being molded exhibited a viscosity of $10^8$ to $10^{10}$ dPa·s and, while maintaining this temperature, a pressing rod 13 was dropped downward to press down on upper mold 1 and press the preform that had been placed in the pressing mold. The pressure applied during pressing was 8 MPa and the pressing time was 30 s. Following pressing, the pressure was removed. The molded glass article that had been press molded was cooled to a temperature at which the viscosity of the glass was $10^{12}$ dPa·s or greater while still in contact with lower mold 2 and upper mold 1, cooled rapidly to room temperature, and then removed from the pressing mold to obtain an aspherical lens. In FIG. 1, support member 10 supports lower mold 2 and sleeve mold 3. Support rod 9 supports upper mold 1, lower mold 2, sleeve mold 3, and support member 10, as well as receiving the pressure imparted by pressing rod 13. A thermocouple 14 is inserted into the interior of lower mold 2 to monitor the temperature within the pressing mold.

The above-described lens is suitable for use as a lens constituting an image pickup optical system. Objective lenses having an aperture number of 0.85 for DVDs were fabricated with a suitable pressing mold and preforms.

The present invention provides a high refractive index, low dispersion optical glass suited to precision press molding. Preforms for precision press molding can be manufactured from the optical glass of the present invention. The present invention further provides an optical element comprised of high refractive index, low dispersion glass.

Although the present invention has been described in considerable detail with regard to certain versions thereof, other versions are possible, and alterations, permutations and equivalents of the version shown will become apparent to those skilled in the art upon a reading of the specification and study of the drawings. Also, the various features of the versions herein can be combined in various ways to provide additional versions of the present invention. Furthermore, certain terminology has been used for the purposes of descriptive clarity, and not to limit the present invention. Therefore, any appended claims should not be limited to the description of the preferred versions contained herein and should include all such alterations, permutations, and equivalents as fall within the true spirit and scope of the present invention.

Having now fully described this invention, it will be understood to those of ordinary skill in the art that the methods of the present invention can be carried out with a wide and equivalent range of conditions, formulations, and other parameters without departing from the scope of the invention or any embodiments thereof.

All patents and publications cited herein are hereby fully incorporated by reference in their entirety. The citation of any publication is for its disclosure prior to the filing date and should not be construed as an admission that such publication is prior art or that the present invention is not entitled to antedate such publication by virtue of prior invention.

What is claimed is:

1. An optical glass having a refractive index $n_d$ of greater than 1.71 and an Abbé number of 51.00 or greater, and, given as mole percentages, comprising:

|  |  |
|---|---|
| $B_2O_3$ | 20 to 80 percent, |
| $SiO_2$ | 0 to 30 percent, |
| $Li_2O$ | 1 to 25 percent; |
| ZnO | 0 to 20 percent, |
| $La_2O_3$ | 4 to 30 percent, |
| $Gd_2O_3$ | 1 to 25 percent, |
| $Y_2O_3$ | 0 to 20 percent, |
| $ZrO_2$ | 0 to 5 percent, |
| MgO | 0 to 25 percent, |
| CaO | 0 to 15 percent, |
| SrO | 0 to 10 percent, | with the combined quantity of the above components being 97 percent or greater;
wherein the molar ratio of $\{ZnO/(La_2O_3+Gd_2O_3+Y_2O_3)\}$ being 0.8 or less and the molar ratio of $\{(CaO+SrO+BaO)/(La_2O_3+Gd_2O_3+Y_2O_3)\}$ being 0.8 or less;
wherein $Ta_2O_5$ may be incorporated at 0 to 1 mol percent, with the molar ratio $\{(ZrO_2+Ta_2O_5)/(La_2O_3+Gd_2O_3+Y_2O_3)\}$ being 0.4 or less; and
wherein there is no fluorine.

2. The glass of claim 1, wherein the combined quantity of $Li_2O$ and ZnO ranges from 2 to 30 percent, and the molar ratio of $ZnO/Li_2O$ is equal to or less than 6.

3. A preform for precision press molding comprised of the glass of claim 2.

4. A method of manufacturing an optical element comprising heating and precision press molding a preform of claim 3 to produce an optical element.

5. The method of claim 4, wherein the preform is introduced to a pressing mold, the pressing mold and preform are heated together, and then precision press molding is conducted.

6. An optical element comprised of the glass of claim 2.

7. A method of manufacturing a preform for precision press molding comprising separating glass melt gobs from an outflowing glass melt and forming the glass melt gobs into a preform for precision press molding in a cooling step, wherein the preform for precision press molding is formed from the glass of claim 2.

8. A method of manufacturing an optical element comprising heating and precision press molding a preform by the method of claim 7 to produce an optical element.

9. The method of claim 8, wherein the preform is introduced to a pressing mold, the pressing mold and preform are heated together, and then precision press molding is conducted.

10. The glass of claim 1, wherein the refractive index $n_d$ and Abbé number $\nu_d$ satisfy equation (1) below:

$$n_d \geq 2.235 - 0.1 \times \nu_d \qquad (1).$$

11. A preform for precision press molding comprised of the glass of claim 10.

12. A method of manufacturing an optical element comprising heating and precision press molding a preform of claim 11 to produce an optical element.

13. The method of claim 12, wherein the preform is introduced to a pressing mold, the pressing mold and preform are heated together, and then precision press molding is conducted.

14. An optical element comprised of the glass of claim 10.

15. A method of manufacturing a preform for precision press molding comprising separating glass melt gobs from an outflowing glass melt and forming the glass melt gobs into a preform for precision press molding in a cooling step, wherein the preform for precision press molding is formed from the glass of claim 10.

16. A method of manufacturing an optical element comprising heating and precision press molding a preform prepared by the method of claim 15 to produce an optical element.

17. The method of claim 16, wherein the preform is introduced to a pressing mold, the pressing mold and preform are heated together, and then precision press molding is conducted.

18. A preform for precision press molding comprised of the glass of claim 1.

19. A method of manufacturing an optical element comprising heating and precision press molding a preform of claim 18 to produce an optical element.

20. The method of claim 19, wherein the preform is introduced to a pressing mold, the pressing mold and preform are heated together, and then precision press molding is conducted.

21. The method of claim 19, wherein the preform is heated and introduced into a pressing mold that has been preheated and then the preform is precision press molded.

22. An optical element comprised of the glass of claim 1.

23. A method of manufacturing a preform for precision press molding comprising separating glass melt gobs from an outflowing glass melt and forming the glass melt gobs into a preform for precision press molding in a cooling step, wherein the preform for precision press molding is formed from the glass of claim 1.

24. A method of manufacturing an optical element comprising heating and precision press molding a preform for precision press molding a glass prepared by the method of claim 23 to produce an optical element.

25. The method of claim 24, wherein the preform is introduced to a pressing mold, the pressing mold and preform are heated together, and then precision press molding is conducted.

26. The optical glass as recited in claim 1, wherein the refractive index is 1.71287 or greater.

* * * * *